(No Model.) 2 Sheets—Sheet 1.
A. M. STONER.
VELOCIPEDE.
No. 418,963. Patented Jan. 7, 1890.
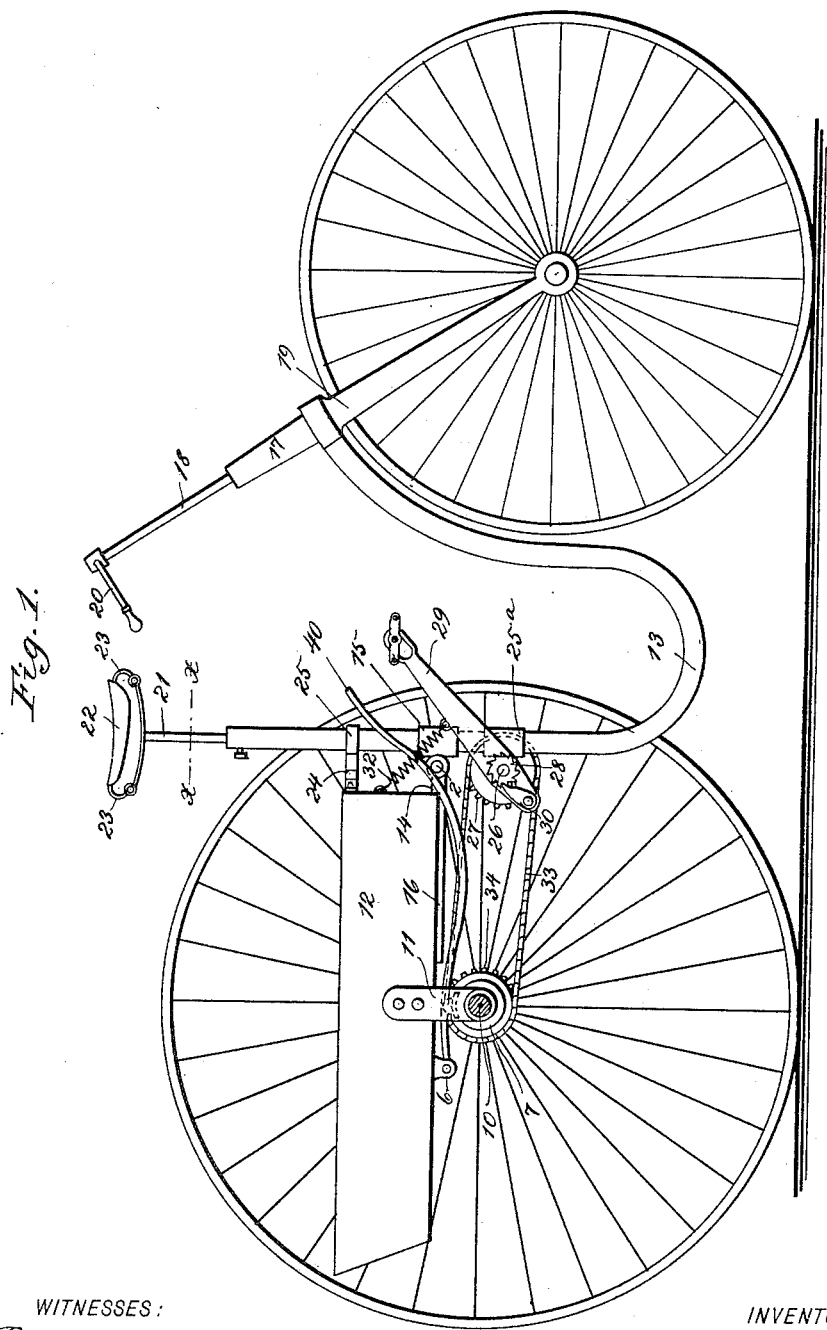
WITNESSES:
D. C. Reusch.
Wm. W. Luyster
INVENTOR:
Allen M. Stoner
BY Munn &Co.
ATTORNEYS

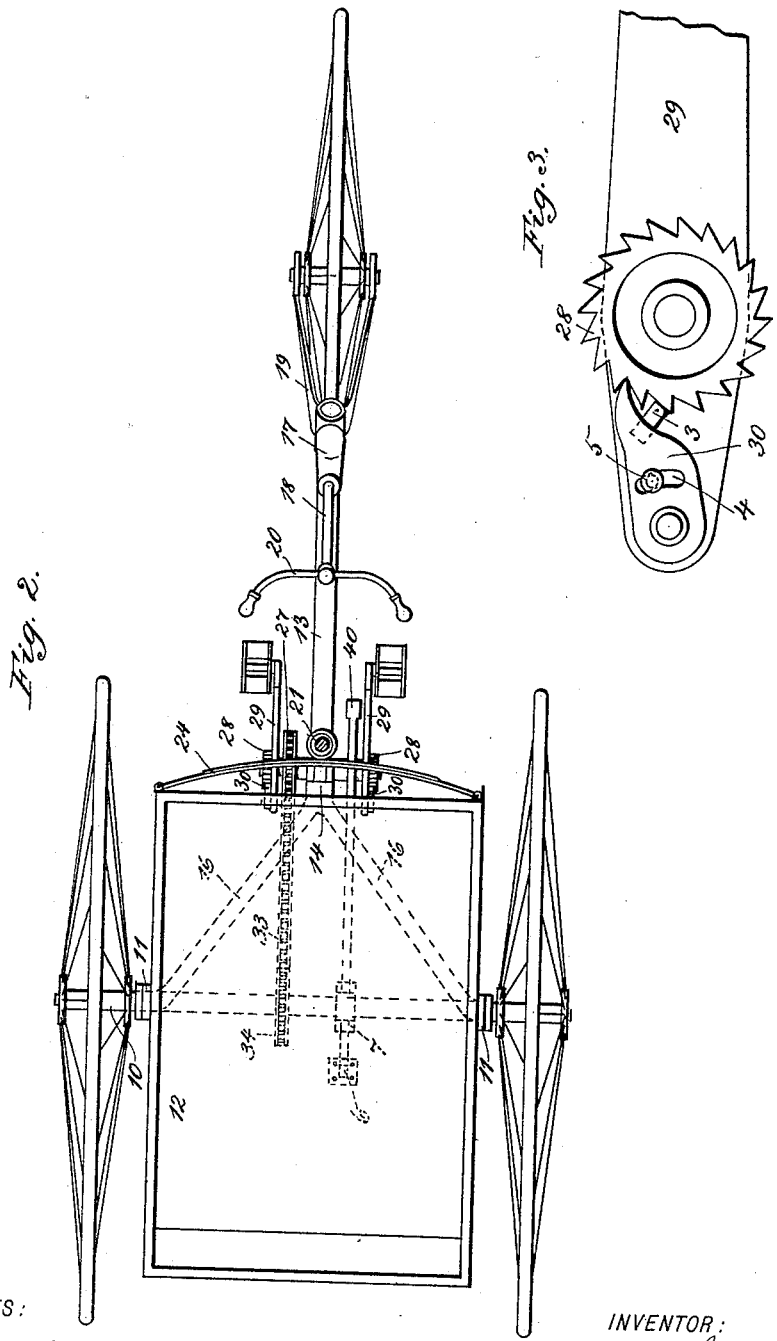

UNITED STATES PATENT OFFICE.

ALLEN M. STONER, OF TOPEKA, KANSAS.

VELOCIPEDE.

SPECIFICATION forming part of Letters Patent No. 418,963, dated January 7, 1890.

Application filed September 30, 1889. Serial No. 325,510. (No model.)

*To all whom it may concern:*

Be it known that I, ALLEN M. STONER, of Topeka, in the county of Shawnee and State of Kansas, have invented a new and Improved Velocipede, of which the following is a full, clear, and exact description.

This invention relates to velocipedes of the class illustrated, described, and claimed in my prior patent, No. 378,631, which said patent was granted to me on the 28th day of February, 1888, the object of the present invention being to improve the construction forming the subject-matter of the patent above referred to.
To the end named the invention consists of certain novel constructions, arrangements, and combinations of elements, which will be hereinafter explained, and specifically pointed out in the claims.
Reference is to be had to the accompanying drawings, forming a part of this specification, in which similar figures of reference indicate corresponding parts in all the figures.

Figure 1 is a side view of my improved velocipede, the right-hand hind wheel being removed. Fig. 2 is a sectional plan view on the line *x x* of Fig. 1; and Fig. 3 is an enlarged detail view of one of the pedal-levers, its pawl, and one of the ratchets upon which the pawl operates.

In the drawings, 10 represents the rear axle of the velocipede, upon which axle there are loosely mounted upwardly-extending standards or pedestals 11, which serve as supports for a wagon-body 12, the forward end of said body being supported by a reach or backbone 13, to which it is connected through the medium of a forwardly-extending projection 14 and a sleeve 15, there being a swivel-joint 2 between the projection and the sleeve. In order that the projection 14 may be properly braced, I make it integral with diverging straps 16, that are secured to the under side of the wagon-body 12. The outer end of the backbone 13 supports a socket 17, through which the shank 18 of the forward wheel-fork 19 extends, the upper end of the shank being provided with a steering-bar 20, the same as are ordinarily employed in bicycles and tri-cycles. The rear upper end of the backbone is socketed to receive the standard 21 of a seat or saddle 22, said seat being supported by springs 23. To prevent all undue shock and jar between the wagon-body and the rear section of the backbone, I arrange a spring 24, such spring being connected to a sleeve 25, that is secured to the backbone, the ends of the spring bearing against the wagon-body, as is clearly shown in the drawings.

Beneath the sleeve 15, I arrange a sleeve 25ª, which sleeve serves as the support for a shaft 26, that carries a chain-wheel 27 and two rigidly-mounted ratchets 28. Just within the ratchets 28, I mount pedal-levers 29, that carry gravity-pawls 30, the pawls being arranged to engage the ratchets 28, and in connection with each of the pedal-levers I mount a spring 32, said springs normally holding the pedal-levers in the position in which they are shown in Fig. 1, the tension of the springs being, however, such that the levers may be easily depressed by the rider.

Upon the chain-wheel 27 there runs a driving-chain 33, which engages a chain-wheel 34, that is rigidly mounted upon the axle 10, the arrangement being such that when the shaft 26 is rotated a corresponding motion will be imparted to the axle 10.

In the operation it will be seen that at each downward movement of the forward end of either of the levers 29 the pawls 30 will engage the ratchets 28, and the forward movement will be imparted to the shaft 26; but when the pressure upon either of the levers is removed the springs 32 will act to return them to their normal position, as is shown in Fig. 1. The pawls 30 at this time slip over the ratchet-teeth. Ordinarily this slipping of the pawls over their ratchet-teeth is accompanied by a disagreeable noise, and to obviate such noise I provide each of the pawls with a rubber plug 3. (See Fig. 3.) Although not at all essential, I greatly prefer to form each pawl with a slot 4, that is concentric with the axis of the pivot or stud upon which the pawl is mounted, a headed retaining-pin 5 being passed through the slot 4 to prevent any outward movement of the pawl.

With velocipedes of this character it is desirable that a brake be provided, and to that end I mount a lever 40, as shown best in Fig. 1, the lever being pivotally connected to the wagon-body at 6 and being provided with a shoe, (shown in dotted lines in Figs. 1 and 2,) which said shoe may, by pressure upon the forward end of the lever 40, be thrown to bear upon a disk 7, that is rigidly connected to the shaft 10.

By means of the construction above described I secure an exceedingly easy-riding velocipede, which, by the peculiar arrangement of the driving mechanism, I am enabled to propel up very steep grades.

Having thus fully described my invention, I claim as new and desire to secure by Letters Patent—

1. The combination, with a vehicle-body and its supporting-axle, of a backbone or reach to which the forward end of the vehicle-body is connected, a caster-wheel carried by the reach, and a spring arranged between the rear reach-section and the outer end of the vehicle-body.

2. In a velocipede, the combination, with the rear axle, a reach, the rear end of which is vertical, and a wheel carried by the reach, of a body supported on the axle and pivotally connected to the vertical member of the reach, and a spring between the reach and end of the body, substantially as described.

3. In a velocipede, the combination, with the rear axle, a reach, and a wheel carried by the said reach, of a body supported by the axle and having a swivel-connection between it and the reach, and a spring secured to the reach and having its ends resting against the end of the body, substantially as herein shown and described.

4. In a velocipede, the combination, with the rear axle and chain-wheels carried thereby, of a reach having a vertical member and carrying a wheel at its forward end, shafts carried by the vertical member of the reach, chain-wheels on the shafts, a chain passing around said chain-wheels, ratchet-wheels on the said shaft, pedals mounted on the shafts and provided with pawls engaging the ratchet-wheels, and springs for returning the pedals to their normal position, substantially as herein shown and described.

ALLEN M. STONER.

Witnesses:
A. W. KNOWLES,
C. V. WOLF.